May 26, 1931.     P. E. WELTON     1,807,055
MOLDING PRESS
Filed Nov. 4, 1929     5 Sheets-Sheet 1

Inventor
Park E. Welton
By Robert M. Pierson,
Attorney

May 26, 1931.  P. E. WELTON  1,807,055
MOLDING PRESS
Filed Nov. 4, 1929  5 Sheets-Sheet 2

Inventor
Park E. Welton
By Robert McPierson
Attorney

May 26, 1931.　　　P. E. WELTON　　　1,807,055
MOLDING PRESS
Filed Nov. 4, 1929　　　5 Sheets-Sheet 3

Inventor
Park E. Welton,
By Robert M. Pierson,
Attorney

May 26, 1931.   P. E. WELTON   1,807,055
MOLDING PRESS
Filed Nov. 4, 1929    5 Sheets-Sheet 4
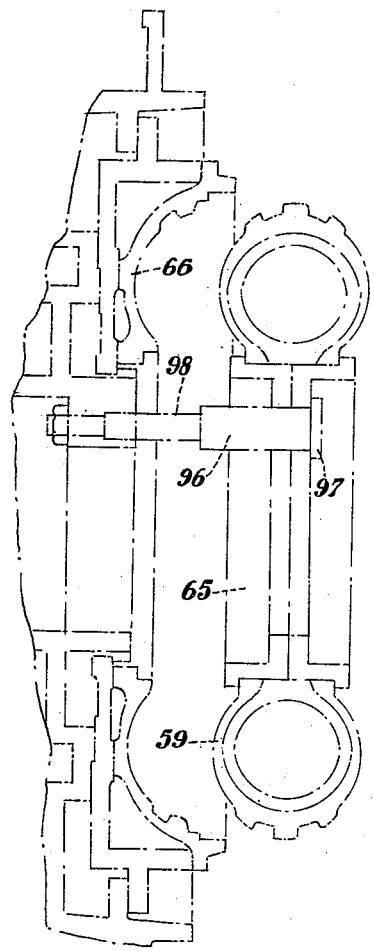
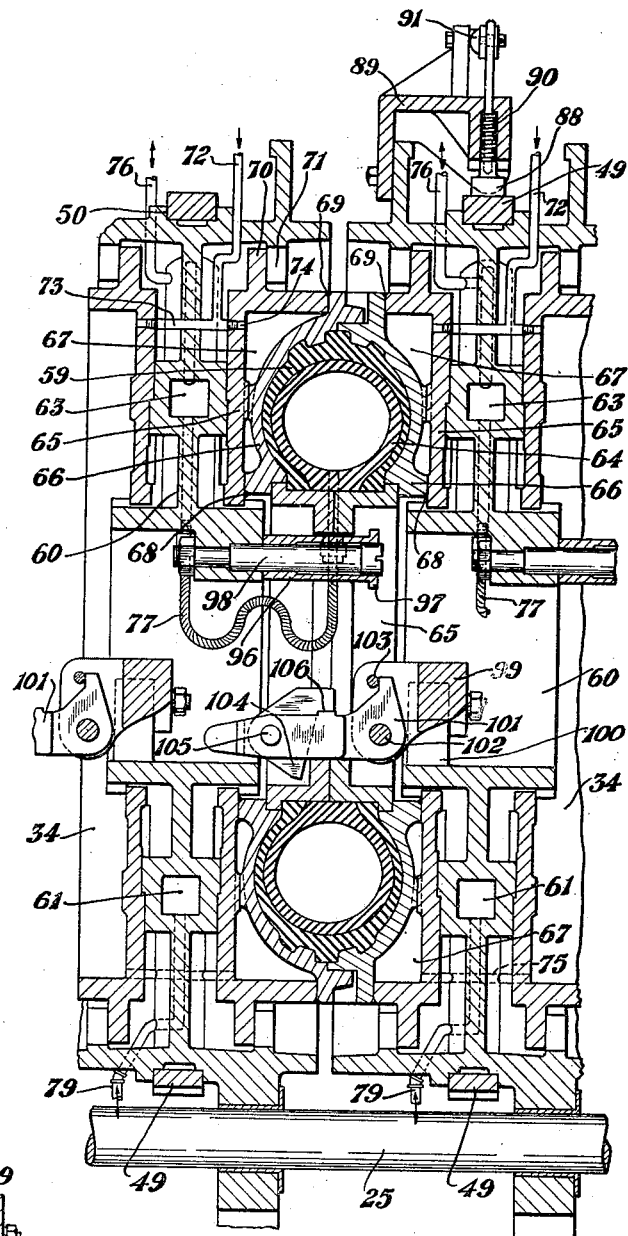
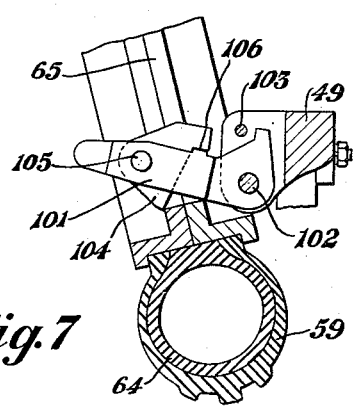
Fig.7
Fig.6
Inventor
Park E. Welton,
By Robert McPierson,
Attorney

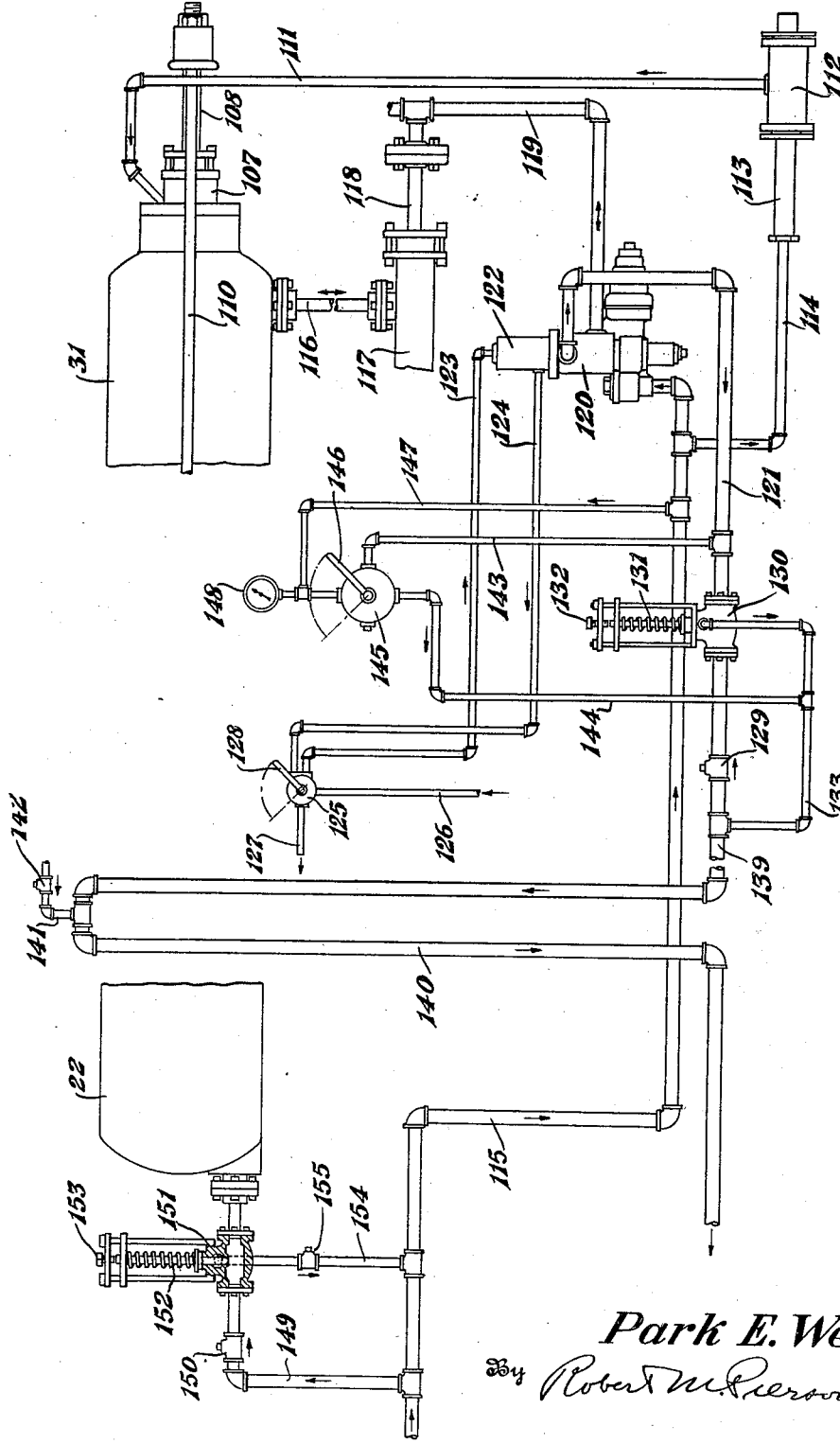

Patented May 26, 1931

1,807,055

UNITED STATES PATENT OFFICE

PARK E. WELTON, OF CUYAHOGA FALLS, OHIO

MOLDING PRESS

Application filed November 4, 1929. Serial No. 404,604.

This invention relates to multiple-mold presses adapted to be opened at selected points to insert and remove the work while remaining closed at other points for continuation of the molding action. Presses of this class, for example, are useful in the vulcanization of rubber articles such as pneumatic tires where a single article is vulcanized in each mold, or for smaller articles such as heels, etc., which are vulcanized in multiple-cavity molds.

For tire casings it is generally more convenient to place the molds with their planes vertical, in a horizontal group or stack, and to mount them permanently in the apparatus so that only the article itself is inserted and removed. For pneumatic tubes and smaller articles the mold group and the direction of molding pressure may be either vertical or horizontal, and it is often convenient, particularly where multiple-cavity molds are employed, to removably mount the molds proper between plain steam-heated molding plates which are permanently mounted in the press. My present invention in some particulars applies to all of these different arrangements. In other and more specific aspects it relates to the molding of pneumatic tire casings, and is here illustrated as embodied in a tire vulcanizer with a horizontal mold group.

One of my objects is to effect a saving of time and labor in the opening and closing of the group of molds or heater sections at any selected point while leaving it closed at other points, as by providing for collective setting of a plurality of locks pertaining to each mold or heater section to make or break the connection of the particular section with power rods or the like actuated by pressure-ram devices.

Another object is to save time and labor in the setting of locks and to facilitate the selection of the proper point for opening the group, as by providing fluid-pressure lock-setting rams and locating their control valves on the individual sections.

A further object is to provide improved quick-acting means for holding both ends of the mold group under closing pressure while said group is being opened and held open at any selected point.

A still further object is to enable differential stack-pressing ram devices in an apparatus of this kind to be operated from a single fluid-pressure line.

A further object is to coordinate the operation of devices for opening and closing a tire-mold group with those for controlling the internal fluid pressure within the tires.

An additional object is to insure the proper stripping of tires from their molds with the least expenditure of power.

Other and ancillary objects will appear from the succeeding description, taken in connection with the claims.

Of the accompanying drawings,

Fig. 6 is a longitudinal section on an enlarged scale as compared with Figs. 1 and 2, showing one of the molds and adjacent parts for a tire of slightly different size, the fluid passages being partly in diagram, this view also illustrating in broken lines the position of one of the mold sections and the cured tire after the mold has been opened and the tire stripped therefrom.

Fig. 7 is a detail section showing the operation of the tire stripper.

Figure 9:
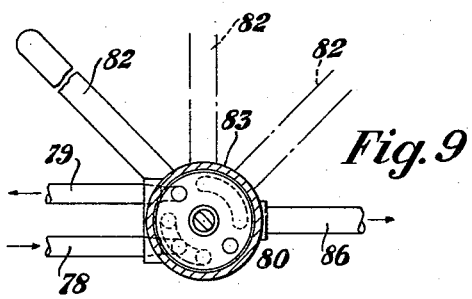
Figure 10:
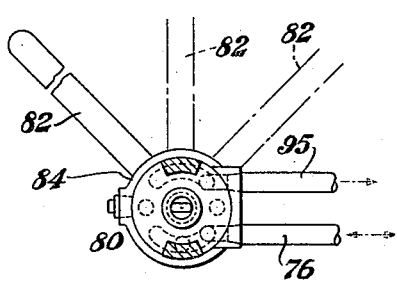
Figure 8:
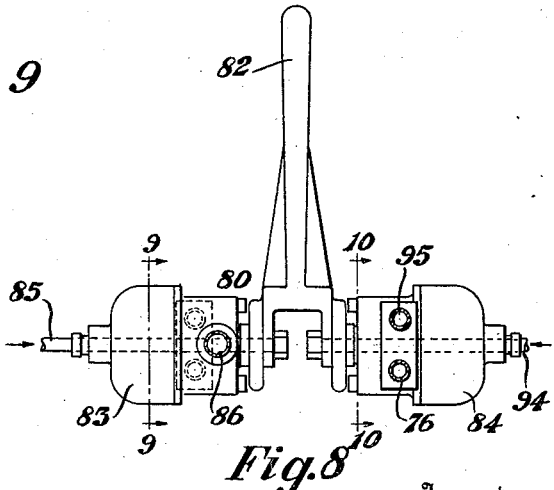
Fig. 8 is a front elevation of one of the lock-setter and bag-pressure control-valve devices.

Figs. 9 and 10 are cross-sections thereof on the lines 9—9 and 10—10 of Fig. 8.

Fig. 11 is a diagrammatic side elevation, partly in section, showing the pressure-ram and operating-ram devices and their fluid-pressure connections and control devices.

While a preferred embodiment, showing a horizontal vulcanizer for tire casings, has been selected for illustration, many variations of structure, arrangement, and adaptation for different articles might be made, and features omitted or added, without departing from my invention as defined in the claims.

Heretofore, multiple tire-casing press vulcanizers actually used in the art, so far as I am aware, have been confined on the one hand, to double "watch-case" apparatus and on the other to pot-heater presses where a stack of molds all in the same state of vulcanization are held between press platens. It is highly desirable from the standpoint of heat-saving, minimum idle time of the apparatus and economy of space occupied, to provide an apparatus in which more than two casings or tubes can be vulcanized at the same time under a system of overlapping cures with selective mold openings, but prior attempts in this direction have not, so far as I know, been successful and the present invention is the first to provide a practical commercial tire vulcanzer of this type.

Among the desirable or essential requirements for a successful apparatus are that when the mold stack is opened at a selected point all the other molds shall be held tightly closed so that fluid pressure within the tires cannot partially open the molds and produce excessive "rinds" of extruded rubber; and also that the operations of locking the mold sections to the power rams preparatory to opening at the selected point may be easily and quickly performed. These and other important requirements are fulfilled in the present invention.

Referring to the drawings, 20 is an I-beam bed frame on which are mounted in vertical planes and horizontally in line with each other a fixed support 21 for the cylinder 22 of a horizontal ram device 23 at one end of the press, a fixed press platen 24 connected with the cylinder support 21 by tie-rods 25, a movable press platen 26 bolted to the end of the piston 27 of ram device 23, and a pair of heads 28, 29 having horizontal movements to and from stop shoulders at the ends of a fixed stop plate or lug 30, the head 28 supporting the cylinder 31 of a ram device 32 located in line with the ram device 23 at the opposite end of the press, and the head 29 being bolted to the end of the piston 33 of said ram device 32. In the cylinder 22, which may be termed the "pressure" cylinder, hydraulic pressure is constantly maintained for holding the press closed, while the cylinder 31, which may be termed the "operating" cylinder, is intermittently charged and discharged to open the press at selected points against the pressure in cylinder 22 and permit reclosure thereof, its piston being of larger diameter than that of cylinder 22.

Between the platens 24 and 26 are mounted in vertical planes a horizontal group of press plates 34 having in this instance incorporated therewith a series of tire-mold halves or sections with intervening tire-mold cavities 35 here shown as three in number. This number might be increased or decreased according to the number of units it is desired to handle within the capacity of the press. The two end plates 34 are permanently locked to the respective platens 24 and 26. The number of tires which one man can handle in a press of this kind operated on a system of overlapping cures is determined by the length of time it takes to vulcanize one tire, divided by the time required to open and close the press and remove and insert a tire.

To the respective operating heads 28 and 29 are attached pull rods and push rods constituting power devices extending past and parallel with the group of press plates 34 and adapted to be connected with the members of any selected pair of said plates by means of suitable locks, for opening the plate group at any desired point to remove a vulcanized tire and insert a fresh one, and for holding the sub-groups against the respective platens 24 and 26. There are three pull rods 36 bolted at their outer ends to the head 28 and an equal number of push rods 37 bolted at their outer ends to the head 29, all of said rods, as well as the tie rods 25, passing through suitable apertures in the flanges of the press plates 34.

Each press plate has two series of locks for connecting it alternatively with the pull rods and the push rods, and means are provided for concurrently setting all of the locks on each plate. These locks are numbered 38 (Figs. 4 and 5) for the pull rods 36, and 39 for the push rods 37, and are in the form of rotary collars or sleeves mounted in boxes 40 on the press plates and confined against axial movement thereon by the end walls or flanges 41 of said boxes. The boxes are provided with covers 42 which are removable to afford access to the locks. These locking collars are slidingly mounted on or in line with the push and pull rods, and each is formed with internally-projecting lugs 43 adapted to be moved, by turning the collars, into and out of line with externally-projecting lugs 44 formed on the rods 36 and 37, the assemblage operating somewhat on the principle of a breech-block or bayonet lock.

Each of the locking collars 38 and 39 is externally formed over a part of its periphery with gear teeth 45 and an adjacent concave face 46 adapted to mate respectively with gear teeth 47 and adjacent convex faces 48 formed on an actuating ring 49 which surrounds the press plate and is circumferentially slidable in a guiding groove 50 thereon in the plane of the locking collars. In moving counter-clockwise as viewed in Fig. 4, from one end of its stroke to mid-position, this ring 49 turns the collars 39 to bring their lugs out of registry with those on the push rods 37, or in other words to unlock these collars. In moving from mid-position to the other end of the stroke it turns the collars 38 to bring their lugs into line with those on the pull rods 36 or into locking position with respect thereto. In the opposite direction of movement of the ring these operations are reversed, the collars 38 being first unlocked from the lugs on the pull rods 36, and the collars 39 being subsequently turned into locking position with relation to the lugs on the push rods 37.

For shifting the ring 49 to set the locking collars, I provide a pair of single-acting fluid-pressure (preferably pneumatic) rams radially mounted in the press plate 34 and geared to the ring. 51, 51ª are the two ram cylinders integrally formed in the press-plate casting, and 52, 52 are the ram pistons, each provided at its outer end with a rack 53 whose teeth mesh with those of a pinion 54 fastened to a pair of larger gear pinions 55 which mesh with gear segments 56 bolted to the main segments of ring 49 and forming parts of said ring. Each of these pinion assemblies is mounted to turn on an arbor 57 supported between flanges of the press plate. The racks 53 are backed by guide rollers 58. The two racks being at opposite sides of their respective pinions, the ram pistons 52 move reciprocally, one being on its outstroke while the other is on its instroke and vice versa.

For locking the ring 49 midway of its stroke, with its gear segments 47 disengaged from both sets of locking collars 38 and 39 and said collars standing in their unlocked positions, I form the upper periphery of the ring with a notch 87 and provide a latching bolt 88 mounted to slide vertically in a bracket 89 fixed to the plate 34, and pressed toward the ring by a spring 90, together with a lever 91 pivoted to the bracket and to the stem of the latch-bolt for manually retracting said bolt against the pressure of the spring. Lugs 92 on the ring 49 alternately abut against the heads of corresponding adjustable stop screws 93 for limiting the stroke of the ring in each direction and insuring that one set of the locking collars will have their lugs properly deregistered with those on the corresponding rods while the other set of collars is locked.

Each of the press plates 34 in this instance has incorporated therewith two half molds for molding the tire casings 59, one of which casings is indicated in Fig. 6. I have here illustrated and improved construction of the press plates and mold halves or sections and an improved detachable connection between the two. 60 is the body plate or main casting of the press plate, formed with a central web structure, suitable stiffening and supporting webs, flanges etc. at its inner and outer peripheries and its intermediate portion, and also with the described ram cylinders 51, 51ª and various fluid ducts and passages. The transverse stiffening webs and other portions of the body casting 60 include walls defining a pair of arcuate chambers 61 placed concentric with the axis of the press plate and angularly spaced apart thereon for receiving pneumatic pressure and exhaust to charge and discharge the ram cylinders 51, 51ª through short connecting passages 62 at their inner ends, and a similar concentric, arcuate fluid-pressure chamber 63 located between the chambers 61 for charging and discharging the expansible core or pressure bag 64 placed within the tire casing 59, said bag being inflated either with gaseous fluid such as compressed air or with hot water in accordance with common practice, and said bag, together with the tire casing, being mounted on a two-part inner rim 65 between the mold sections.

The several mold halves or sections are individually steam jacketed and my improved construction and mounting thereof includes a back plate 65 and a front plate 66 enclosing a steam chamber 67 between them, said plates being integrally connected at their inner and outer peripheries by means of welded seams 68, 69. The front plate 66 is formed with a molding cavity constituting one-half of the tire-receiving cavity, and the back plate 65 is detachably mounted in the body plate or casting 60 and connected therewith by a quick-acting lock of the breech-block type including spaced outwardly-projecting lugs 70 on plate 65 adapted to pass between and to be turned into registry with inwardly-projecting spaced lugs 71 on the body casting, these lugs having a wedging engagement with each other. Thereby I provide a simple and inexpensive construction of the mold sections and a detachable connection permitting them to be readily removed and replaced for repair or substitution of mold sections of a different size or different formation of mold cavity.

Figure 4:
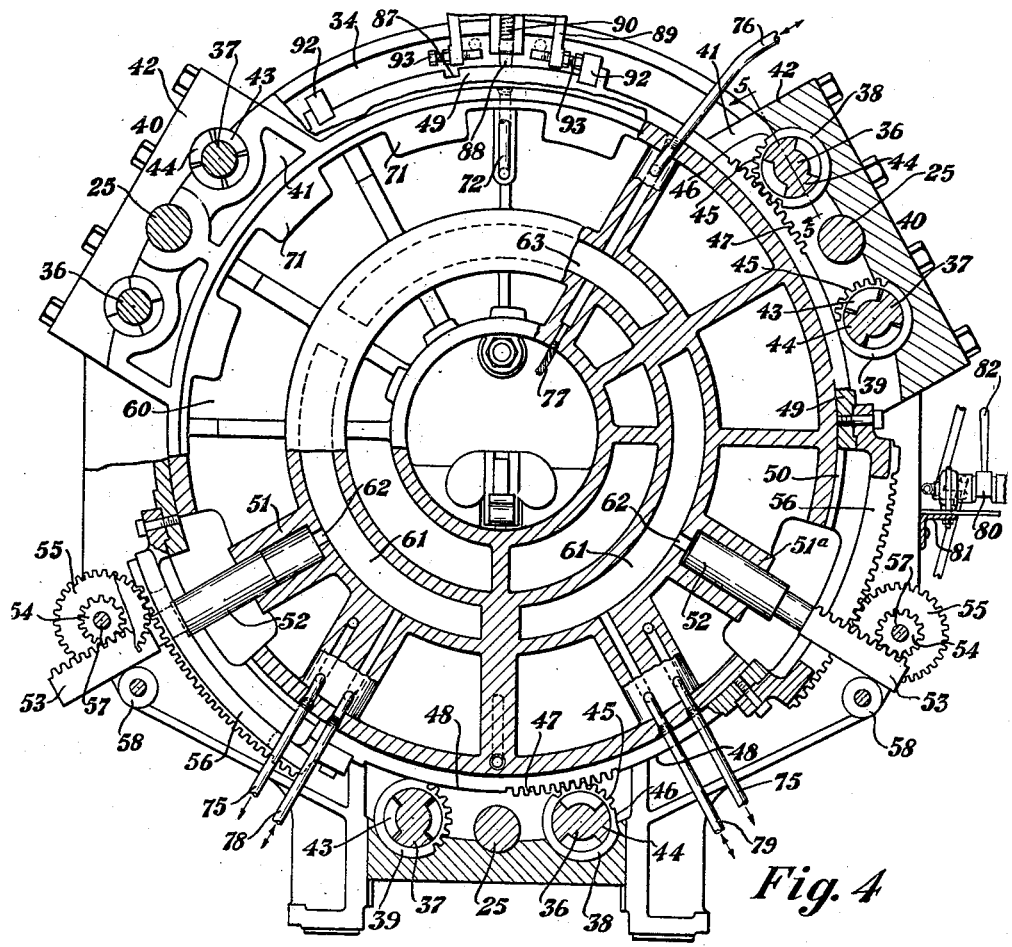
Fig. 4 is a front elevation, partly in section, of one of the mold sections.
Figure 5:
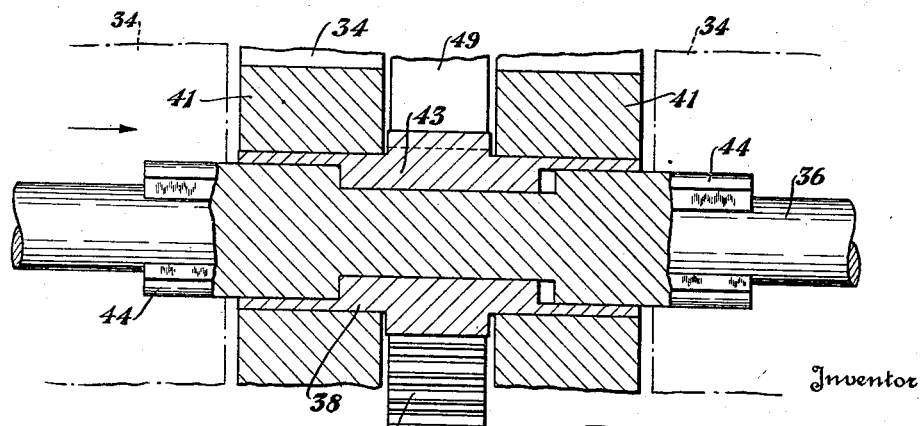
Fig. 5 is a detail partial longitudinal section and elevation of one of the power rods and locks.

The connections for supplying and discharging the steam jackets 67 are indicated somewhat diagrammatically in Figs. 4 and 6, 72 being the steam supply pipe or passage entering the upper part of the body casting of each of the press plates 34 and connected by lateral branches 73, 74 with the respective jacket chambers 67 on the two sides of said press plate. Passages 75 for discharging steam and water of condensation from the lower portions of the jacket chambers are partially shown. These views also illustrate a portion of the other fluid-pressure connections, including a compressed-air pipe 76 leading to the arcuate chamber 63, a flexible pipe 77 leading therefrom with a quick-detachable connection to the air bag 64 for charging and discharging the latter, and pipes 78, 79 connecting with the respective arcuate chambers 61 for charging and discharging the pneumatic ram cylinders which operate the lock-shifting ring. On charging the left-hand ram cylinder 51 as viewed in Fig. 4 through the pipe 78 and discharging the right-hand cylinder 51ᵃ through pipe 79, the press plate will be locked to the pull rods 36, and on reversing this operation it will be locked to the push rods 37.

Suitable articulated swing joints (not shown) may be provided for connecting the air and steam chambers of each of the press plate with corresponding fixed trunk pipes.

Individual control devices are provided for charging and discharging the air bags and the lock-shifting ram cylinders on each press plate, and I prefer to mount these control devices directly on the individual plates so that the point at which the mold group is to be opened for the removal of a fully-cured tire casing and the insertion of a fresh one may be readily selected, this point being usually determined by the operation of a suitable time-signal system. It is further desirable to interconnect the control valves for the lock-shifting devices and the pressure bag respectively, so that the locks cannot be set to open the selected mold cavity without first discharging its pressure bag and vice versa. One of these control devices 80 is shown mounted upon a bracket 81 on one of the press plates 34 in Figs. 2 and 4, and it will be understood that the other press plates are similarly equipped. The details are shown in Figs. 8, 9 and 10. A common operating handle 82 is connected with the aligned stems of a pair of casings 83, 84 containing plate valves respectively for the lock-setting devices and the air bag. A compressed-air supply pipe 85 leads axially into the valve casing 83, and an exhaust pipe 86 leads from the side of said casing opposite to its connection with the pipes 78, 79 for the pull rod and push rod cylinders 51, 51ᵃ respectively. Similarly an air-supply pipe 94 leads axially into the valve casing 84, while the supply and discharge pipe 76 leading from the air-bag chamber 63 in the press plate and an exhaust pipe 95 are respectively connected into the side of said valve casing.

Figure 2:
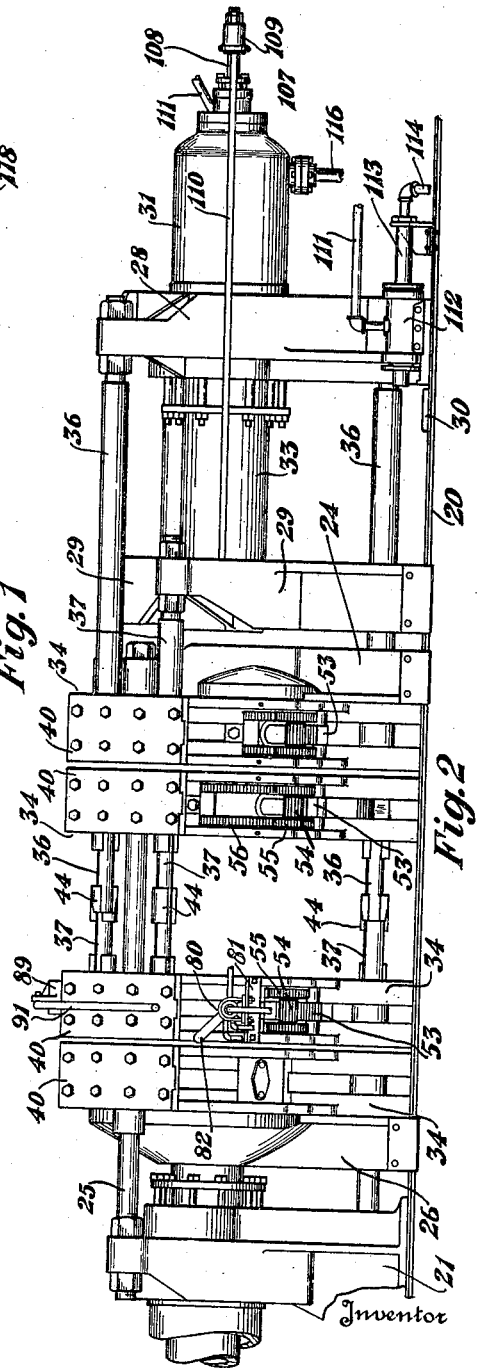
Fig. 2 is a side elevation, partly broken away, showing the mold group opened and omitting some of the valve devices and other accessories.
Figure 3:
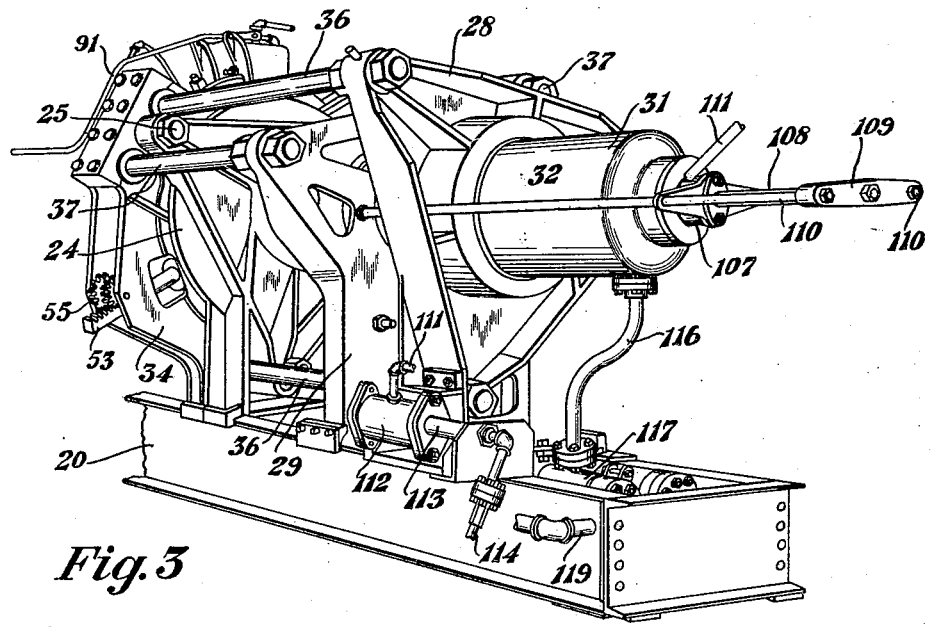
Fig. 3 is a perspective view showing the operating end of the apparatus.

When the control handle 82 is in the position indicated in full lines in Figs. 9 and 10 and also indicated in Fig. 2, the corresponding press plate is locked to the push rods by the charging of cylinder 51ᵃ through pipe 79, and exhausting of the cylinder 51 through pipe 78, and the ports of valve casing 84 are blanked to retain in the bag 59 of the tire in the mold cavity on the left-hand side of the press plate as viewed in Fig. 2, air pressure previously admitted thereto. In the midway or vertical position of said handle the press plate will be unlocked from both the push and pull rods and the air pressure in the bag will be on, this being the position in which all molds are closed. In the right-hand position of handle 82 indicated in broken lines, the press plate will be locked to the pull rods and unlocked from the push rods, and the air-bag of the tire in the adjacent mold cavity at its left will be discharged.

Referring to Fig. 6, which is a sectional view looking toward the front of the press, and to Fig. 7, each press plate 34 at the left of a molding cavity (or at the right as viewed from the front in Figs. 1 and 2) is provided at the upper side of its inner periphery with a member for supporting the rimmed tire by the inner periphery of the rim's central flange structure, in registry with the tire cavity. As here shown, said member is a roller 96 having a flange 97 at its outer end and mounted to turn and also to slide telescopically on a stud or arbor 98 fixed in a lug on the body casting 60 and projecting parallel with the axis of the press plate. At the lower inner periphery of the press plate to the right of the mold cavity as viewed in Fig. 6 I provide a cooperating tire puller or stripper here shown as comprising a bracket 99 bolted to lug 100 on the body casting 60, a gravity latch 101 pivoted at 102 on said bracket and having a stop heel engaging a pin 103 on the bracket to hold the latch in position for engagement with a tire rim when the mold is open, and a pawl or tooth member 104 pivoted at 105 on said latch, said pawl having a heel projection engaging a stop face 106 on the latch to resist pulling movement of the pawl against the tire rim 65. The purpose of using a pivoted pawl 104 is to facilitate the unhooking of the latch from the tire rim at the completion of the stripping movement. When the mold sections are separated to remove a vulcanized tire, the supporting roller 96 and the latch 101 serve in conjunction with each other to strip the tire from that mold section to which it clings. If the tire sticks in the left-hand mold section as viewed in Fig. 6, the tooth of pawl 104 on the right-hand section immediately engages the tire rim and draws the tire out of the mold section beginning at its lower periphery and causing it to tilt at an angle to the vertical plane as indicated in Fig. 7 while the mold sections are being separated. The supporting roller 96 begins to slide out on its stud 98 during this stripping action and continues until stopped by the head of the stud and the mold sections continue to separate thereafter. The angularity of the tire increases until it reaches approximately the position indicated in Fig. 7, whereupon the tooth of pawl 104 slips over the edge of the tire rim flange and said pawl turns upwardly on pivot 105 to avoid catching its tooth on any intermediate projection of said flange. The tire rim is thereby freed from the stripper latch and the tire falls back to the vertical position in the separated relation with respect to the left-hand mold section 66 indicated in broken lines at the left of Fig. 6. Should the tire stick in the right-hand mold section as the two sections separate, the supporting roller 96 is drawn out to the limit of its movement and the stripping of the tire then begins at the upper periphery under the action of the roller flange 97 in conjunction with the latch 101 holding the tire at its lower periphery until the parts reach the relation indicated in Fig. 7, whereupon the latch is released from the tire and the latter falls into its vertical position while the right-hand mold section continues to draw away from the stationary left-hand section.

Figure 1:
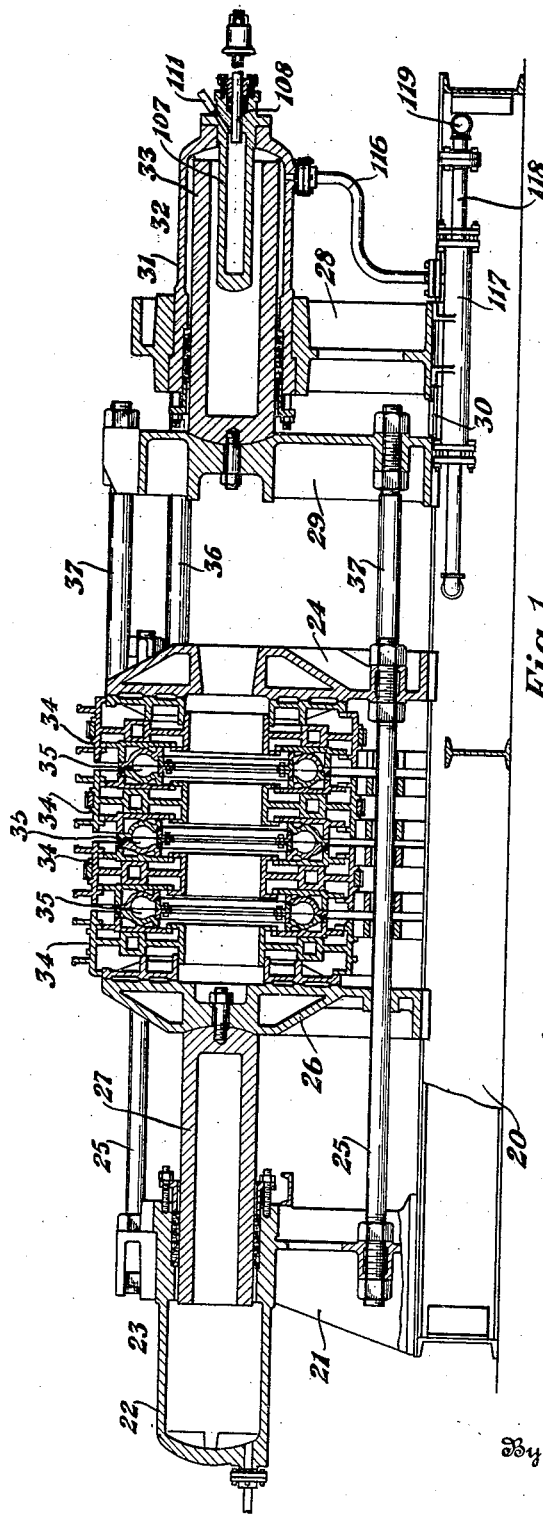
Fig. 1 is a longitudinal vertical section of a tire-vulcanizing apparatus embodying my invention, with the mold stack or group in closed condition, the details of piping, passages, etc., being omitted.

When the mold group is to be parted at a selected point, that section immediately at the left of the dividing plane as viewed in Figs. 1 and 2 is coupled to the push rods 37 and the section immediately to the right is coupled to the pull rods 36. On admission of hydraulic pressure to the operating cylinder 31, the head 29 and the left-hand sub-group of mold sections are then pushed to the left against the pressure in ram cylinder 22. When this occurs, it is highly important that the sub-group of mold sections to the right of the parting plane shall be held together and against the fixed press platen 24 with a force greater than the mold-separating force caused by expanding pressure in the air-bags within the tires, in order to avoid any slight opening of the molds and extrusion of softened rubber from tires undergoing vulcanization therein. This is accomplished by moving ram cylinder 31 and its head 28 a short distance to the right under the influence of the hydraulic pressure in said cylinder to take up any slack in the pull rods 36 and the collars by which they are locked to the endmost mold section at the parting plane.

When the mold group is again closed by relieving the pressure in the operating cylinder 31 sufficiently to allow that in cylinder 22 to predominate, and after said operating pressure has been brought back to the minimum, it is necessary to slack off the rods 36 and 37 to relieve the pressure of their lugs 44 against those of the locking collars 38 and 39 and thus to free said collars in order that they may be turned to their unlocked positions. This slacking-off of the rods is accomplished by drawing together the heads 28 and 29 against the stop lug 30 by means of a small hydraulic ram device conveniently mounted on the end of the operating cylinder 31, said ram device comprising a cylinder 107 embraced by cylinder 31 and partly contained within the hollow piston 33 when the latter is retracted, a ram or piston 108 working in said cylinder 107, a yoke 109 at the outer end of said piston and a pair of tie rods 110 connecting said yoke with the head 29. Hydraulic pressure from a supply main is carried to cylinder 107 through a pipe 111 and is constantly maintained therein. When the pressure in cylinder 31 has been drawn down to a minimum, the pressure in cylinder 107 acting oppositely upon the latter and upon piston 108 draws the cylinder 32 and its head 28 to the left and head 29 and its piston 33 to the right until said heads come against the stop lug 30, thus freeing the locks on the rods 36 and 37.

Pipe 111 leads into the outer casing of a telescopic slip joint 112 carried by the head 28, and the inner or pipe member 113 of said joint is fixed to a bracket on the bed frame 20 and connects by a pipe 114 with the hydraulic supply main 115 as indicated in the diagram view of Fig. 11.

A branch pipe 116 runs from the operating cylinder 31 to the outer casing of a telescopic slip joint 117 fixed on the under side of the head 28, the inner or pipe member 118 of said joint being fixed to the bed frame and extending through both ends of the casing, said ends being connected in a loop to balance the pressure and avoid end thrust. A pipe section or branch 119 leads from the slip-joint pipe 118 to the hydraulic control valve for the operating cylinder 31. A similar balancing arrangement could be used for the slip joint 112 and either or both of these joints could be substituted by other forms of compensating pipe connections.

In the diagram of hydraulic connections shown in Fig. 11, 120 is a standard form of hydraulic control valve operated by pneumatic pressure, here used for connecting the branch pipe 119 from the operating cylinder 31 alternately with the hydraulic supply main 115 and a discharge or exhaust line 121. The pneumatic cylinder 122 at the top of this valve is connected by compressed-air supply and exhaust pipes 123, 124 with the casing of a manually-operated air-control valve 125 with which are also connected a compressed-air supply pipe 126 and an exhaust pipe 127. The operating handle 128 of said valve is shown in its right-hand position in which the air pressure is exhausted from cylinder 122, allowing the valve 120 to shut off the hydraulic pressure from operating cylinder 31 and open it to the discharge line 121.

After the mold group has been opened at a selected point and is being closed by a reduction of hydraulic pressure in the operating cylinder 31 so that the constantly-acting pressure in cylinder 22 can expel the piston 27, a back pressure must be maintained in cylinder 31 sufficient in amount to overcome the air-bag pressure in the tires and avoid any separation of the molds in the two sub-groups while the latter are being closed together. Assuming that an air-bag pressure of about 250 pounds per square inch is employed, it has been found that a back pressure of 750 pounds per square inch in cylinder 31 will suffice to overcome this air-bag pressure for tire casings of the larger sizes. For smaller casings, the amount of this back pressure can be reduced on account of the smaller area of said tires, the ram areas remaining the same. This back pressure is established by inserting a check-valve 129 in the discharge line 121 and locating an automatic relief valve 130 on said line between the check valve and the control valve 120, said relief valve having a loading spring 131 and an adjusting screw 132 to limit its opening, and serving to control the outlet through a branch pipe or loop 133 which leads from the relief valve casing back into the draining portion 134 of the discharge line at a point posterior to the check-valve 129.

The drain line 139 leads to a sewer or other convenient waste point and in order to prevent the emptying of the operating cylinder 31 by gravity when the drain line and its connections are open I form a portion of said line into a loop 140 which extends above the level of cylinder 31. The summit of said loop is connected with an atmospheric inlet pipe 141 containing a check valve 142 to prevent siphon action.

For relieving the back pressure in discharge line 121 and reducing the pressure in cylinder 31 to a minimum amount represented by the slight difference in level between said cylinder and the summit of loop 140, I provide a by-pass line 143, 144 connected at one end with the discharge line 121 and at the other end with the pipe 133 so as to straddle the back-pressure valve 130, and in this by-pass I locate a manual control valve 145 whose operating handle 146 is shown in its right-hand position for opening the by-pass 143, 144 to relieve the back-pressure. When handle 146 is placed vertically, the by-pass is closed and the pressure is retained in the discharge line 121 up to the point established by the relief valve 130. This same manual control valve 145 is also used to supply pressure from the hydraulic main 115 to the discharge line 121 and the cylinder 31 through a branch pipe 147 and the pipe 143 when handle 146 is thrown over to the left. In this way any leakage of water from the cylinder 31 and its connections through glands or otherwise may be made up and the cylinder 31 and its piping kept full of water so that when the operating pressure is turned on there will be no extreme reduction of pressure in the supply main due to the filling of an empty or partly empty cylinder and piping.

I have shown both the ram cylinders 22 and 31 supplied by the same hydraulic main 115, in which a suitable high pressure such as 1200 to 1500 pounds per square inch may be established, a pressure gauge 148 being shown in branch connection with the pipe 147 for indicating the amount of this pressure. This avoids the necessity of providing separate pumping equipment and accumulators for supplying the respective ram cylinders. In order to avoid a momentary reduction of pressure in cylinder 22 when cylinder 31 or the ram cylinders of other presses which may be connected with the same supply line are opened to the line, caused by filling the ram cylinder faster than the pressure can be supplied to the main 115 in full amount, which reduction might be so great that the pressure in the tire air-bags would overcome that in cylinder 22 and permit the molds to open or "breathe" and extrude the softened rubber, it is desirable to establish a back pressure in cylinder 22 during the retraction of its piston 27, above the pressure momentarily existing in the main 115 while the pressure in cylinder 31 is being built up. To this end, the branch pipe 149 leading into cylinder 22 from the anterior portion of the hydraulic main 115 is provided with a check-valve 150, and between said valve and cylinder there is located on pipe 149 an automatic relief valve 151 similar to the back-pressure valve 130, said valve having a loading spring 152 and an adjusting screw 153 for limiting its opening movement. This valve discharges through a feed-back or by-pass pipe 154 into the main 115 and said pipe contains a check-valve 155 for protecting the relief valve against back surges of pressure. Valve 151 may be set to open, for example, at the normal pressure of the main 115 such as 1500 pounds per square inch. When the ram piston 27 is pushed back by the pressure in the operating cylinder 31 to open the mold group at a selected point, the water from cylinder 22 returns into the main 115, but its pressure cannot fall below that established by the loaded valve 151 and consequently it is not affected by any pressure drop in the line 115.

In the operation of this apparatus, assuming the group of press plates 34 and their mold sections to be closed and all tires in the molds undergoing vulcanization, the handle 128 of the pneumatic valve 125 will be in its right-hand position as indicated in Fig. 11, causing the main valve 120 to close the connection between the operating cylinder 31 and the supply main 115 and opening its connection with the discharge line 121. The handle 146 of by-pass control valve 145 will also be in its right-hand position, opening the discharge line 121 past the back-pressure valve 130 into the drain section 139 of said line through the pipes 143, 144 and 133. The pressure in cylinder 31 will thus be at its minimum and that in the small ram cylinder 107 will be holding the heads 28 and 29 against the stop lug 30 to slack off the push and pull rods 36, 37 and free the locking collars 38, 39. Both sets of said collars on each of the press plates will be unlocked, with their operating rings 49 each occupying an intermediate angular position and so held by the latching bolts 88. The handles 82 of the control valves 80 on the several pressure plates will be in their vertical positions, shutting off the air pressure from the lock-operating cylinder 51, 51ª and admitting air-pressure to the bags 64 to distend the tire casings 59.

When a fully-cured tire is to be removed and a raw tire substituted, the handle of the latch lever 91 on that press plate immediately to the right (as viewed in Figs. 1 and 2) of the plane at which the plate group is to be parted is depressed to withdraw its latching bolt 88 from the notch 87 in the corresponding lock-operating ring 49, and while it is so held, the handle 82 of the control-valve device 80 on said press plate is thrown to the right. This exhausts the air-pressure in the bag 64 of the tire in the mold cavity to be opened, and at the same time supplies air pressure to the ram cylinder 51 of that press plate while opening the other ram cylinder 51ª to the exhaust, thereby causing the ring 49 to be shifted counter-clockwise to the position shown in Fig. 4 and turning the locking collars 38 to bring their lugs into line with the corresponding lugs on the pull rods 36, the collars 39 on the push rods remaining unlocked. Similar operations are performed with the latch lever 91 and the control-valve device 80 on the press plate immediately to the left of the parting plane, except that the handle 82 of its valve device is thrown to the left as shown in Figs. 2, 9 and 10, holding air pressure in the bag of the next-adjacent mold cavity at the left, and charging the cylinder 51ª of that plate while discharging its cylinder 51, thereby moving its ring 49 clockwise and turning its locking collars 39 into locking relation with the push rods 37, the collars 38 meanwhile remaining unlocked from the pull rods 36. As soon as either ring 49 is thus shifted from its locked position, the corresponding hand-lever 91 may be released and the latch bolt 88 will ride on the plain outer periphery of the ring.

The locking collars having thus been set to part the mold group, and the air-bag of the tire to be removed having been discharged, the handle 146 of valve 145 may be momentarily thrown over to the left to open the hydraulic discharge line 121 to the supply main 115 and thus make up any possible deficiency of water volume and initial pressure in said line and its connections including the clearances of the operating cylinder 31. Said handle is then moved to a vertical position, closing said connection and shutting off the by-pass 143, 144.

Pressure from the supply main 115 is now admitted directly into the piping 119, 118, 116 and control cylinder 31 through the main control valve 120 by throwing the handle 128 of the pneumatic valve 125 over to the left. This pressure, acting on the areas of ram cylinder 31 and its piston 33, which are greater than those of ram cylinder 22 and its piston 27, first causes cylinder 31 and its supporting head 28 to move a short distance to the right to take up the slack between the pull rods 36 and their locks and thus hold those mold sections to the right of the parting plane under full pressure of the operating ram. Immediately thereafter, the ram piston 33 moves the head 29 to the left and through the push rods 37 it forces back those mold sections to the left of the parting plane, together with the movable press platen 26 and the pressure-ram piston 27, against the pressure in ram cylinder 22. The water in said cylinder escapes back into the main 115 through the relief valve 151 and pipe 154, and the loading of said valve maintains sufficient back pressure in cylinder 22 to avoid any opening by internal pressure of tire-containing molds which may be at the left of the parting plane. The parting of the mold sections causes the cured tire to be stripped from the mold halves by the coaction of the flanged roller 96 and the hooked latch 101 in the manner previously described, and leaves said tire hanging on the extended roller as shown in broken lines at the left of Fig. 6. Fig. 1 represents the closed condition of the press and Fig. 2 represents its condition when the plate group has been opened at the middle one of the three tire cavities,—the tires, stripping devices and some of the other accessories being omitted for clearness of illustration. With the plate group opened, the cured tire may be removed with its rim and contained pressure bag, after disconnection of the flexible air pipe 77, and an uncured tire with rim and air-bag placed on the extended roller 96 and coupled up with pipe 77.

To close the press, the operator throws the handle 128 of pneumatic valve 125 to the right to shut off the connection of operating cylinder 31 with the supply main 115 through the valve 120 and open its connection with the discharge line 121. The handle 146 of valve 145 remaining in its vertical position to close the by-pass through pipes 143, 144, the pressure in cylinder 31 will be relieved through valve 130 and pipe 133 into the drain pipe 139 down to the assumed limit of 750 lbs. per square inch back pressure established by said valve 130, and the preponderating pressure in ram cylinder 22 will close the two ends of the mold group together upon the raw tire, against said back pressure which insures the sealing of molds in both sub-groups during the closing movement. Valve handle 146 is then thrown to the right, opening the by-pass 143, 144 to reduce the pressure in cylinder 31 to the minimum and permit the pressure in the small ram cylinder 107 to move the heads 28 and 29 together against the stop lug 30, thus slacking off the power rods 36, 37 and freeing the locking collars 38, 39 on the two mold sections which have just been closed. The valve handles 82 on those sections are then thrown toward each other momentarily past their middle positions to exhaust the previously active cylinders of the pair 51, 51ª and charge the inactive ones in order to bring their lock-setting rings 49 to an intermediate position in which they will be locked by the automatic engagement of the bolts 88 in the notches 87 of said rings, whereupon said handles 82 are restored to their vertical positions, the bag of the newly-inserted tire is inflated and vulcanization proceeds. This completes the operative cycle and the foregoing operations may be repeated for another tire cavity in the mold group when the tire in that cavity is ready to be removed and replaced.

With this press, one man can handle all the operations for a large number of tires, the steam consumption and the floor space occupied are small as compared with other systems, and the further advantages referred to in the introduction are realized.

I claim:

1. In a molding press, the combination of a group of press plates pertaining to a plurality of molds, power means extending past said plates longitudinally of the group for opening the group at any selected point, a plurality of locks associated with each of said plates, for individually connecting them with the power means, and means individual to each plate for collectively setting its locks.

2. In a vulcanizer, the combination of a group of mold heaters, a plurality of power rods extending parallel with the group, a plurality of locks associated with each heater for connecting them with the rods, and lock-setting means on each heater common to its several locks.

3. In a tire vulcanizer, the combination of a group of individually-heated mold sections formed with tire-molding cavities between them, fluid-pressure ram means having power rods extending longitudinally of the group, a plurality of locks for each mold section to connect said section with the rods, and an actuator on each mold section for collectively setting its locks.

4. In a molding press, the combination of a group of press plates, a power rod common to the members of said group and formed with a locking lug for each of the plates, and rotary locks axially confined on the plates, surrounding and axially slidable on the rod and each having a lug movable, by turning the lock, into and out of line with the corresponding rod lug.

5. In a molding press, the combination of an axially-movable press plate, a plurality of power rods provided with locking members for moving said plate, rotary locking collars slidable along said rods and axially confined on the plate, and a ring mounted on said plate and geared to said collars for turning them into and out of locking relation with the locking members on said rods.

6. In a molding press, the combination of a group of press plates, power means for opening said group at any selected point, locks individual to the respective plates for selectively connecting them with said power means, and fluid-pressure devices associated with the several plates for individually setting their respective locks.

7. In a molding press, the combination of a power device, a group of press plates having individual locks for connection with said power device, a fluid-pressure lock-setting ram on each plate, and individual valve devices for controlling the several rams.

8. In a molding press, the combination of a power device, an annular press plate having a lock for connection with said power device, and a lock-actuating pressure-cylinder and piston radially positioned on said plate.

9. In a molding press, the combination of a power device, a press plate having a lock for connection with said power device, and a pair of single-acting fluid-pressure cylinders and pistons radially positioned and angularly spaced apart on said plate for shifting said lock in opposite directions.

10. In a molding press, the combination of a plurality of power rods, a press plate having rotary locking collars on said rods, a ring on said plate geared to said collars, and a pair of single-acting fluid-pressure rams mounted on said plate and connected with said ring by gearing including rack-and-pinion devices for moving said ring in opposite directions.

11. In a molding press, the combination of a power device, a press plate having a lock for connecting it therewith, fluid-pressure means for operating said lock, and means controllable by the operator independently of said fluid-pressure means for holding said lock in its unlocked position.

12. In a molding press, the combination of a group of press plates, a pair of power devices adapted to be connected with respective members of any selected pair of said plates for opening the group between said pair, a pair of interconnected locks on each plate for alternatively connecting it with the respective power devices or disconnecting it from both of them, oppositely-acting fluid-pressure devices for operating said locks, and an automatically-engaged, manually-retractible latch device for holding said locks in their unlocked positions.

13. In a molding press, the combination of a power device, a group of press plates having individual, fluid-pressure-operated locks for connection with said power device, and individual valve devices mounted on the respective plates for controlling the corresponding locks.

14. In a tire press, the combination of a sectional tire mold, power means for separating the mold sections, a lock for connecting a mold section with said power means, tire-inflating means, and control devices for said lock and said inflating means, interconnected to set the lock in mold-opening position when the inflating pressure is released and vice versa.

15. In a tire vulcanizer, the combination of a power device, a group of tire-mold sections having individual fluid-pressure-operated locks for connecting them with said power device to open the group at any selected point, a tire-inflating device for each mold, and a pair of control valves having a common operating handle for each mold, to operatively set a selected lock while deflating the corresponding tire, and vice versa.

16. A tire vulcanizer including a group of tire-mold plates, each provided with a ram cylinder and with transverse stiffening webs defining a plurality of fluid-pressure chambers spaced apart in the plane of the plate, one of said chambers communicating with said ram cylinder, means for charging and discharging said chamber, a supply passage leading to another of said chambers, and a tire-inflating passage leading from said other chamber.

17. A tire press comprising a group of pairs of tire-mold sections, means for holding said group closed, means for opening said group at selected points between members of a pair, and means brought into action by separation of the sections for progressively stripping the tires by tilting them with respect to the mold sections.

18. A tire press comprising a pair of tire-mold sections, a tire support on one of said sections, movable transversely of the plane of separation between the sections, and a tire stripper located substantially at a diametrically opposite point on the other section for progressively tilting the tire to loosen it from the mold.

19. A tire press comprising a pair of annular tire-mold sections, means for supporting a rimmed tire on one of said sections by the upper side of the inner periphery of its rim, and a stripper pawl pivotally mounted on the other section at the lower side of its inner periphery and having a tire-rim-engaging tooth pivoted for upward retraction by the rim when released therefrom due to increasing angularity of the tire and the pawl.

20. A molding press comprising a pair of platens, a group of mold sections adapted to be held under pressure between them, differentially-acting fluid-pressure ram devices mounted substantially in line with each other for holding the group closed and for opening the group at selected points while holding the active sections closed under ram pressure, and means for selectively connecting one of said ram devices with the respective mold sections.

21. A molding press comprising a group of press plates, differential fluid-pressure devices for dividing the group at selected points while holding the active sections in both sub-groups closed by fluid pressure, push and pull rods associated with one of said devices for connection with the respective members of any selected pair of plates at corresponding selected points along said rods, and means for locking the rods to the plates at these selected points.

22. A molding press comprising a group of press plates adapted to be divided at selected points, a constantly-acting fluid-pressure ram furnishing pressure in one direction against said group, an intermittently-acting ram-and-cylinder device furnishing pressure in opposite directions to divide the group against the pressure of the first-said ram and in conjunction therewith to hold one sub-group under pressure while separately holding the other sub-group under pressure, push and pull devices connected with the respective members of said ram-and-cylinder device and adapted to be coupled at selected points along their length to corresponding selected press plates, and means for coupling said push and pull devices to the plates at these selected points.

23. A molding press comprising fixed and movable platens, a group of press plates mounted between said platens, a pressure ram acting constantly against one of said platens to close the plate group, a pair of heads movable in line with said platens, a ram device having cylinder and piston respectively connecting with said heads, push and pull rods connected with the respective heads, and means for connecting said rods with respective members of any selected pair of press plates to divide the group and hold both sub-groups closed under ram pressure.

24. A molding press comprising a group of press plates, means for holding said group closed, means including lock devices for opening the group at any selected point, and separate means for freeing the lock devices after closure of the group.

25. A molding press comprising a group of press plates, a fluid-pressure ram for holding the group closed, means including a fluid-pressure device, push and pull rods and locks on said rods at the respective plates for dividing the group at any selected point against the pressure of said ram and holding both sub-groups closed under fluid-pressure, and means for slacking off said rods to free the locks after re-closure of the group.

26. A molding press comprising a group of press plates, fluid-pressure means for holding the group closed, means including a fluid-pressure ram device, a rod structure and individual plate locks thereon for opening the group at any selected point, and a constantly-acting fluid-pressure ram device for slacking off said rod structure to free the locks after re-closure of the group.

27. A molding press comprising a group of press plates, means for holding them closed, means including an operating ram and cylinder and locks for selectively opening the group, a lock-freeing ram having a cylinder surrounded by said operating cylinder.

28. A tire press having a horizontal group of sectional tire molds, and horizontally-acting ram devices mounted substantially in line with each other at opposite ends of the press respectively for closing the group and for opening it at selected points while holding the sub-groups closed under ram pressure.

29. A tire press having a horizontal group of tire-mold sections, fixed and movable platens at opposite ends of said group for holding the group closed, a constantly-acting ram device having a piston connected with the movable platen and a cylinder connected by tie rods with the fixed platen, push and pull rods parallel with the mold group, locks for selectively connecting the mold sections respectively with said push and pull rods, and a ram device at the opposite end of the press having cylinder and piston connected respectively with said pull rods and push rods.

30. A tire press having a horizontal group of tire-mold sections, fixed and movable platens at opposite ends of the group, a horizontal ram device at one end of the press acting on said movable platen to close the group, horizontal push and pull rods parallel with the group, locks for selectively connecting the mold sections respectively with said push and pull rods, an operating cylinder and piston at the opposite end of the press, a horizontally-movable head supporting the cylinder and connected with the pull rods, a second horizontally-movable head connected with the piston between said cylinder-supporting head and the fixed platen, and a rod-slacking piston and cylinder having one member connected with the operating cylinder and the other member connected with the second head for drawing said heads together to free said locks.

31. A tire press comprising a group of sectional tire molds, means for expanding the tires in said molds by internal fluid pressure, a hydraulic ram device for holding the group closed, a second hydraulic ram device for opening the group at selected points, a common source of hydraulic pressure supply for said ram devices, and means for maintaining effective hydraulic pressures on said ram devices during their admission and discharge periods greater than the effective tire-expanding pressure.

32. A molding press comprising a group of press plates, differential hydraulic devices supplied from a common pressure line for oppositely acting on said plates, and feedback means connecting one of said devices with the line for automatically maintaining therein a back-pressure above the pressure in the supply line when the latter drops on opening the line to the other device.

33. A tire press comprising a group of tire-mold sections, means for expanding the tires between said sections, a constantly-acting hydraulic cylinder and piston for holding said group closed, an opposing hydraulic operating cylinder and piston for opening the group at selected points, a common hydraulic line for supplying said cylinders, a branch from said line to the constantly-acting cylinder, a check-valve in said branch, a by-pass from said constantly-acting cylinder to the line, and an automatic loaded relief valve in said by-pass.

34. A tire press comprising a group of tire-mold sections, means for expanding the tires between said sections, means for holding the group of sections closed, an opposing hydraulic device for opening the group at selected points, and means for maintaining in said device during closure of the group a back-pressure sufficient to overcome the tire-expanding pressure.

35. A molding press comprising a group of press plates, means including differential constantly-acting and intermittently-acting hydraulic devices supplied from a common source of hydraulic pressure for holding said group closed and for opening it at selected points, a discharge line from the intermittently-acting device, and an automatic loaded relief valve in said line for maintaining a back pressure on said intermittently-acting device.

36. A tire press comprising a group of tire-mold sections, means for expanding the tires between said sections, means including differential constantly-acting and intermittently-acting hydraulic devices for holding said group closed and for opening it at selected points, a common hydraulic supply line for said devices, a discharge line from the intermittently-acting device, means for maintaining a back pressure in said discharge line during closure of the group sufficient to overcome the tire-expanding pressure, and means for charging said discharge line directly from the supply line.

37. A tire press comprising a group of tire-mold sections, means for expanding the tires between said sections, a constantly-acting hydraulic ram device for holding the group closed, an opposing intermittently-acting hydraulic ram device for opening the group at selected points and holding both sub-groups closed under ram pressure, a common hydraulic pressure line for supplying said ram devices, a discharge line from the intermittently-acting ram device, means for automatically maintaining a back pressure in said discharge line during closure of the group sufficient to overcome the tire-expanding pressure, and control-valve mechanism and connections for charging said discharge line directly from said supply line when the group is to be opened and for discharging it of its back pressure after the group has been closed.

38. A molding press comprising a group of press plates, means for holding said group closed, an opposing hydraulic ram device for opening the group at selected points, a discharge line from said ram device, means for maintaining a back-pressure in said discharge line during closure of the group, means for discharging said back pressure, and a drain line connected with the discharge line and having a head-maintaining loop extending above the level of said ram device.

In witness whereof I have hereunto set my hand this 2nd day of November, 1929.

PARK E. WELTON.